Sept. 17, 1929. H. ALBIN 1,728,169
PASSENGER CAR
Filed May 13, 1927
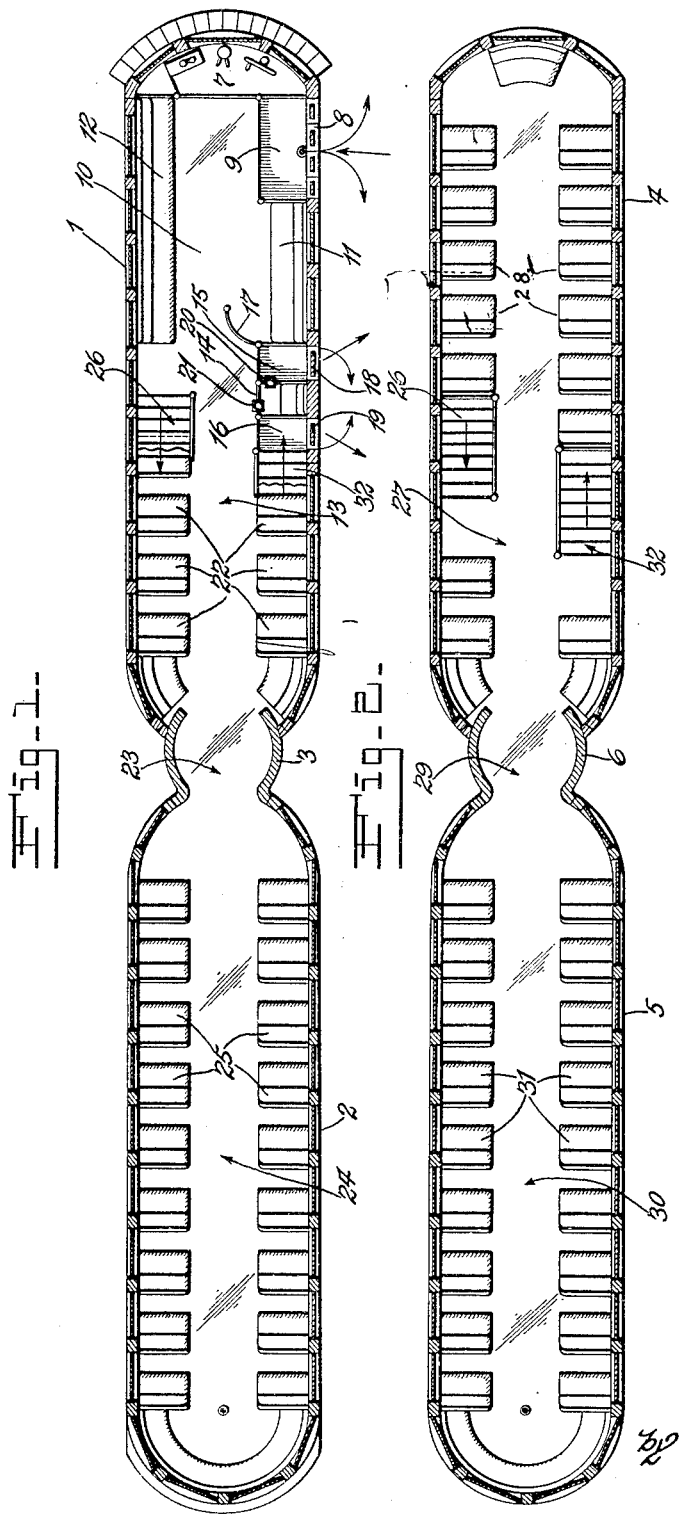

Patented Sept. 17, 1929

1,728,169

UNITED STATES PATENT OFFICE

HERMAN ALBIN, OF ST. LOUIS, MISSOURI; HARRIET ALBIN, EXECUTRIX OF SAID HERMAN ALBIN, DECEASED, ASSIGNOR TO HERSELF

PASSENGER CAR

Application filed May 13, 1927. Serial No. 191,042.

This invention relates to improvements in passenger cars, and consists in the novel construction hereinafter disclosed.

An object of the invention is to improve the construction and arrangement of a passenger car or other conveyance in such a manner as to facilitate the handling of the passengers so that the car may be loaded and unloaded in a minimum amount of time.

Another object of the invention is to provide a conveyance of a construction and arrangement where the passengers may be directed through the conveyance in a manner that the collection of fares and the exit of the passengers may be conveniently controlled from one conductor's station.

Another object of the invention is to provide a passenger conveyance consisting of a primary compartment and a trailer compartment, so associated that the collection of fares and the exit of passengers may be controlled from one conductor's station.

Another object of the invention is to provide a passenger conveyance that may comprise and upper and lower deck with a single point of control of fare collection and exit of passengers.

Other advantages will be apparent from the following detailed description of the construction taken in connection with the accompanying drawing in which, Fig. 1 is a plan view of the lower deck compartments.

Fig. 2 is a plan view of the upper deck compartments.

In the embodiment of the invention illustrated in the drawing, the conveyance is shown as comprising a front compartment 1 and a trailer compartment 2, the two compartments being arranged with a closed vestibule 3, whereby there is intercommunication between the two. Each compartment may be carried on separate pairs of trucks or may be carried on a single pair of trucks with an intermediate truck between the junction of the two compartments.

The upper deck of the conveyance shown in Fig. 2 comprises a front compartment 4 and a rear compartment or trailer 5 connected by an enclosed vestibule 6. The motorman's station 7 is preferably placed at the forward end of the compartment 1 and along one side of the conveyance adjacent to the motorman's station is an entrance door 8 arranged to be controlled by the motorman. The entrance through the door 8 is preferably to a depressed platform 9 from which the passengers pass to an aisle 10 along the sides of which may be arranged longitudinal seats 11 and 12.

The aisle 10 leads into a rear aisle 13 for the compartment 1 and intermediate the portions 10 and 13 is a conductor's station 14 on each side of which is a depressed platform designated respectively as 15 and 16. The aisle 10 has a guide railing 17 to conduct passengers directly from the forward portion of the compartment 1 to the exit platform 15. It is contemplated that passengers leaving the forward portion of the compartment 1 shall deposit their fares as they move from the aisle 10 onto the exit platform 15. Each of the exit platforms is separately controlled by an exit door 18 and 19 respectively, both of which are under the control of the conductor. This arrangement of the two exits one on each side of the conductor's station, permits the conductor to collect the fares of those leaving by the exit door 18 as they step onto the exit platform 15. If desired, the passengers leaving the conveyance directly from the aisle 10 may be required to pay a different or lower fare than those leaving by the exit door 19. For the purpose of segregating the fares, two fare boxes 20 and 21 may be provided, although it will be understood that the fares may be deposited in a single fare box.

The passengers moving from the aisle 10 into the aisle 13 may be required to pay the fare as they move from one aisle to the other. Thus, a portion of the fares may be collected while the car is in motion, so dividing the conductor's time and attention that a larger number of passengers may be handled than in the case where all of the fares are paid either on entrance or exit.

Along the aisle 13 are seats 22. The trailer has direct communication with the aisle 13 through an intermediate passageway 23 and into an aisle 24 of the compartment 2. Seats 25 are provided along the aisle 24 for the accommodation of passengers.

Passengers passing into the aisle 13 from the aisle 10 may either find seats along the aisle 13 or in the rear compartment, or may move to the upper deck by an ascending stairway 26, the base of which is located preferably opposite the conductor's station. The head of the stairs 26 connects with an aisle 27 in the compartment 4 and a series of seats 28 are arranged along the aisle 27. The aisle 27 communicates through an intermediate passageway 29 in the vestibule 6 with an aisle 30 in the compartment 5 along which is arranged a series of seats 31. The passengers leaving either the compartment 4 or the compartment 5 descend a descending stairway 32 that discharges onto the platform 16, from which they pass with the passengers from the rear portion of the compartment 1 and from the compartment 2 through the door 19.

It will be understood that, by the arrangement of the conductor's station opposite the base of the stairs 26, all passengers moving to the upper deck will be required to pay the fare before ascending the stairway, so that the conductor will not be required to give attention to the collection of fares from passengers either from the upper deck or from the rear portion of the compartment 1 or from the compartment 2.

The relative arrangement of space is such that time is economized during the running of the conveyance, so that the time required for the collection of fares is distributed, permitting the handling of passengers in a much quicker time than with any of the present constructions.

It will be understood that, if desired, another conductor's station may be placed in the compartment 2 with the same arrangement in relation to the exit platforms and doors as described in connection with the compartment 1. It will also be understood that, while the invention has been described in relation to passenger cars, it is equally applicable to omnibuses or other public conveyances.

I am aware that the invention may be modified in various particulars without departure from the nature and principle thereof.

I do not restrict myself to unessential details, but what I claim and desire to secure by Letters Patent is:—

1. A passenger car having an entrance door adjacent to and controlled from a station near the front of the car, a pair of spaced exits arranged at one side of the car, a conductor's station in the space at the side of the car between said exits, and separate aisles leading to each exit.

2. A passenger car including a compartment having a depressed entrance platform adjacent to the front end of the car, an entrance door controlling the passage to said platform, a pair of spaced depressed platforms at one side of the car and intermediate the front and rear thereof, exit doors separately controlling said platforms, a conductor's station in the space at the side of the car between said exit platforms, and aisles leading to said platforms.

3. A passenger car including an entrance door at one side and near the front end thereof, a second deck, ascending stairs to said deck, a conductor's station substantially opposite the base of said ascending stairs, exit platforms on each side of the conductor's station, and a descending stairs discharging onto one of said exit platforms.

4. A passenger car including a forward compartment and a trailer compartment, an entrance door near the front end of said forward compartment, exit doors intermediate the front and rear of said forward compartment, a conductor's station between said doors, and an aisle communicating the rear portion of the forward compartment with said trailer compartment.

5. A passenger car comprising an upper and lower deck, an entrance door, a section having an exit door, a conductor's station adjacent to said exit door, ascending stairs to the upper deck substantially opposite the conductor's station, and a separate exit rearwardly of said conductor's station.

HERMAN ALBIN.